(12) United States Patent  
Koike

(10) Patent No.: US 11,070,689 B2  
(45) Date of Patent: Jul. 20, 2021

(54) INFORMATION PROCESSING APPARATUS THAT SWITCHES LANGUAGES TO BE DISPLAYED, CONTROL METHOD THEREFOR, AND STORAGE MEDIUM

(71) Applicant: CANON KABUSHIKI KAISHA, Tokyo (JP)

(72) Inventor: Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/294,126

(22) Filed: Mar. 6, 2019

(65) Prior Publication Data

US 2019/0297206 A1 Sep. 26, 2019

(30) Foreign Application Priority Data

Mar. 20, 2018 (JP) .............................. JP2018-052790  
Nov. 30, 2018 (JP) .............................. JP2018-225119

(51) Int. Cl.
*G06F 3/12* (2006.01)  
*H04N 1/00* (2006.01)  
*G03G 15/00* (2006.01)

(52) U.S. Cl.
CPC ....... *H04N 1/00498* (2013.01); *G03G 15/502* (2013.01); *G06F 3/1205* (2013.01);
(Continued)

(58) Field of Classification Search
CPC ........... H04N 1/00498; H04N 1/00506; H04N 1/00384; H04N 1/00413; H04N 1/00408; H04N 1/00411; H04N 2201/0094
See application file for complete search history.

(56) References Cited

U.S. PATENT DOCUMENTS

2002/0186328 A1* 12/2002 Nishida ..................... H04N 5/60  
    348/738  
2007/0017971 A1* 1/2007 Im ........................... G07F 7/005  
    235/379

(Continued)

FOREIGN PATENT DOCUMENTS

JP    2001260499 A    9/2001  
JP    2005205598 A    8/2005

OTHER PUBLICATIONS

Extended European Search Report issued in European Appln. No. 19161673.9 dated Aug. 22, 2019.

*Primary Examiner* — Moustapha Diaby  
(74) *Attorney, Agent, or Firm* — Rossi, Kimms & McDowell LLP

(57) ABSTRACT

An information processing apparatus which is capable of reliably switching display languages in response to depression of a language switching button. A display language on a display unit is switched to a language selected by a user from a list of languages displayed on the display unit. In response to selection of a language switching button by the user, the display language on the display unit is switched to one of a plurality of languages associated with the language switching button. Currently-displayed language information indicating a language currently displayed on the display unit is obtained when the language switching button is selected by the user. When the language switching button is selected by the user, the display language on the display unit is switched to one of the plurality of languages associated with the language switching button and different from a language currently displayed on the display unit.

7 Claims, 14 Drawing Sheets

(52) U.S. Cl.
CPC .......... *G06F 3/1258* (2013.01); *G06F 3/1285* (2013.01); *H04N 1/00384* (2013.01); *H04N 1/00413* (2013.01); *H04N 1/00514* (2013.01); *H04N 2201/0094* (2013.01)

(56) References Cited

U.S. PATENT DOCUMENTS

| | | | | |
|---|---|---|---|---|
| 2009/0251416 | A1* | 10/2009 | Fujii | H04N 1/00387 345/168 |
| 2012/0010871 | A1* | 1/2012 | Ichimi | G06F 9/454 704/8 |
| 2014/0226066 | A1* | 8/2014 | Fukunaka | G06F 9/454 348/468 |
| 2016/0065788 | A1* | 3/2016 | Hosoda | H04N 1/4433 358/1.13 |

* cited by examiner

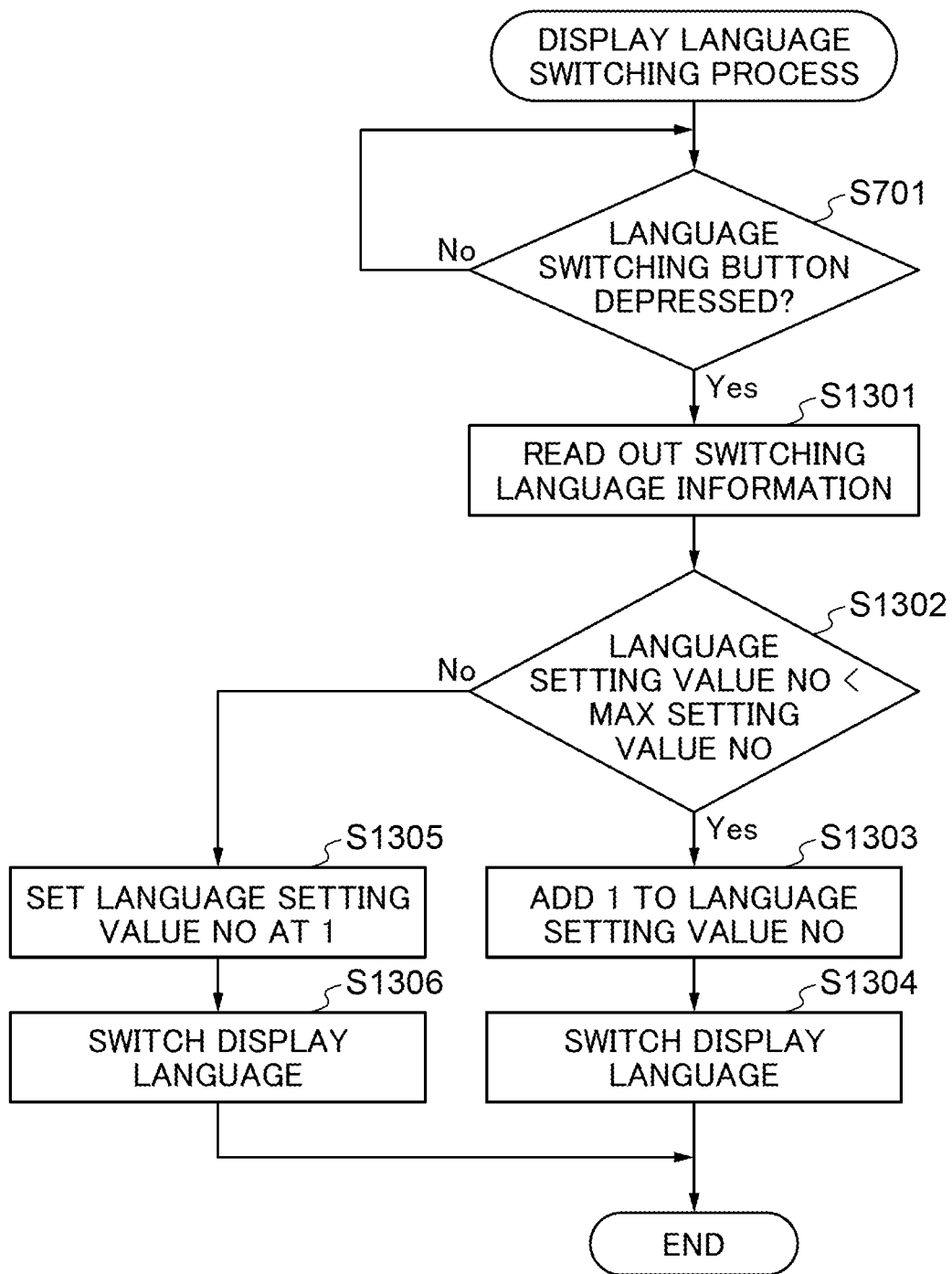

INFORMATION PROCESSING APPARATUS THAT SWITCHES LANGUAGES TO BE DISPLAYED, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

In recent years, a plurality of users who use different languages has increasingly used the same information processing apparatus such as an MFP. To cope with such cases, for example, a display language can be switched using a display language setting screen displayed on the display unit. The display language setting screen includes a list of languages that can be displayed on the display unit. The display language on the display unit is switched to a language selected from the list of languages by the user (see, for example, Japanese Laid-Open Patent Publication (Kokai) No. 2005-205598).

In Japanese Laid-Open Patent Publication (Kokai) No. 2005-205598, however, it is necessary to select environment setting and display setting on a home screen in order to set the display language, and hence operation for setting the display language becomes complicated.

SUMMARY OF THE INVENTION

The present invention provides an information processing apparatus which is capable of reliably switching display languages in response to depression of a language switching button, a control method therefor, and a storage medium.

Accordingly, the present invention provides an information processing apparatus that has a display unit and switches a display language on the display unit, comprising a first switching unit configured to switch the display language on the display unit to a language selected by a user from a list of languages displayed on the display unit, a second switching unit configured to, in response to selection of a language switching instruction receiving button by the user, switch the display language on the display unit to one of a plurality of languages associated with the language switching instruction receiving button, and an obtaining unit configured to obtain currently-displayed language information indicating a language currently displayed on the display unit in response to switching by the first switching unit or the second switching unit when the language switching instruction receiving button is selected by the user, wherein in a case where the language switching instruction receiving button is selected by the user, the second switching unit switches the display language on the display unit to one of the plurality of languages associated with the language switching instruction receiving button and different from a language currently displayed on the display unit.

According to the present invention, display languages are reliably switched in response to depression of the language switching button.

Further features of the present invention will become apparent from the following description of exemplary embodiments (with reference to the attached drawings).

BRIEF DESCRIPTION OF THE DRAWINGS

FIG. 13 is a flowchart showing the procedure of a variation of the display language switching process in FIG. 7.

DESCRIPTION OF THE EMBODIMENTS

An embodiment of the present invention will now be described in detail with reference to the drawings. It should be noted in the following description of the present embodiment, the present invention is applied to an MFP which is an information processing apparatus switching display languages on a display unit, but the present invention is not limited to the MFP. For example, the present invention may also be applied to other apparatuses such as a mobile terminal and a client PC switching display languages on a display unit.

Figure 1:
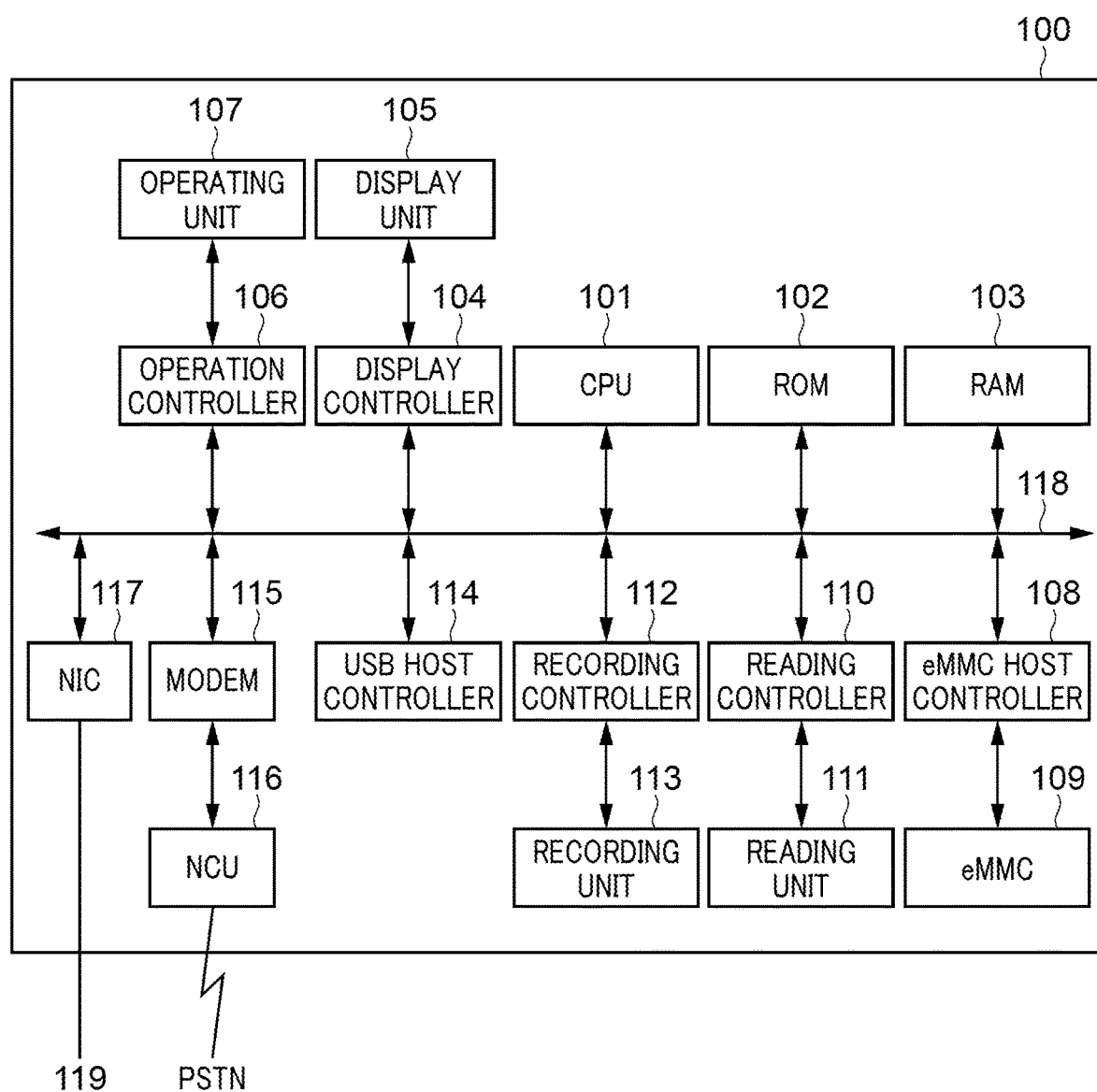
FIG. 1 is a block diagram schematically showing an arrangement of an MFP which is an information processing apparatus according to an embodiment of the present invention.

FIG. 1 is a block diagram schematically showing an arrangement of an MFP 100 which is an information processing apparatus according to the embodiment of the present invention. Referring to FIG. 1, the MFP 100 has a CPU 101, a ROM 102, a RAM 103, a display controller 104, a display unit 105, an operation controller 106, an operating unit 107, an eMMC host controller 108, an eMMC 109, a reading controller 110, a reading unit 111, a recording controller 112, a recording unit 113, a USB host controller 114, a modem 115, an NCU (Network Control Unit) 116, and a NIC (Network Interface Card) 117. The CPU 101, the ROM 102, the RAM 103, the display controller 104, the operation controller 106, the eMMC host controller 108, the reading controller 110, the recording controller 112, the USB host controller 114, the modem 115, and the NIC 117 are connected to one another via a system bus 118.

The MFP 100 is an image forming apparatus which carries out an image forming process. A plurality of native applications implementing a copying function, a scanning function, and a faxing function is installed in advance in the MFP 100. In addition to the plurality of native applications, expansion applications which expand functions can be installed in the MFP 100. In the present embodiment, it is assumed that an expansion application 210 in FIG. 2, to be described later, has already been installed in the MFP 100.

The CPU 101 integratedly controls the devices connected to the system bus 118. For example, when power is supplied to the MFP 100, the CPU 101 executes a boot program stored in the ROM 102. The ROM 102 stores programs and various pieces of data. The RAM 103 is used as a work area for the CPU 101 and also used as a temporary storage area for each piece of data. The display controller 104 is connected to the display unit 105. The display controller 104 performs display control in the display unit 105. The display unit 105 is an LCD which displays a bitmapped image in full screen in a WVGA size. The operation controller 106 is connected to the operating unit 107. The operation controller 106 obtains input information, which is input to the operating unit 107, from the operating unit 107. The operating unit 107 is a touch panel placed on the display unit 105. A user inputs, for example, instructions for processes by depressing operating buttons or the like displayed on the display unit 105. The eMMC host controller 108 is connected to the eMMC 109. The CPU 101 accesses the eMMC 109 via the eMMC host controller 108. The eMMC 109 stores image data, each piece of setting data on the MFP 100, and so forth.

The reading controller 110 is connected to the reading unit 111 and controls operation of the reading unit 111. The reading unit 111 reads originals placed on it. The reading unit 111 has an auto document feeder (not shown) attached thereto and is able to automatically read a plurality of originals. The recording controller 112 is connected to the recording unit 113 and controls operation of the recording unit 113. The recording unit 113 performs printing on sheets using an electrophotographic process. The USB host controller 114 controls USB protocols and acts as an arbitrator for access to a USB device such as a USB memory connected to the MFP 100. The modem 115 is connected to the NCU 116. The modem 115 performs modulation and demodulation of signals required for facsimile communications. The signals modulated by the modem 115 are transmitted to a public switched telephone network (PSTN) via the NCU 116. The NIC 117 sends and receives data such as emails and files to an external apparatus (not shown) via a LAN 119.

Figure 2:
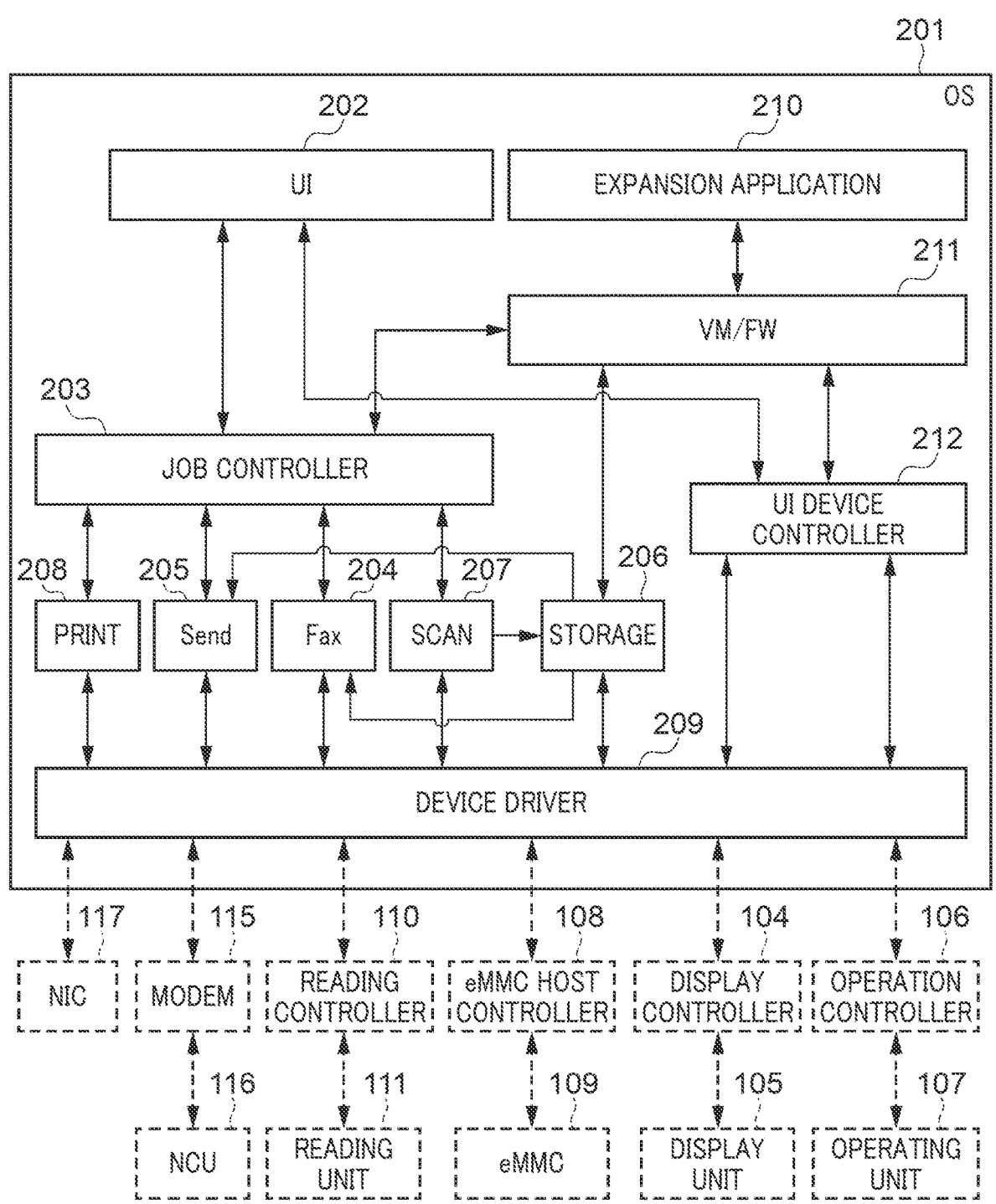
FIG. 2 is a block diagram schematically showing a software arrangement of the MFP in FIG. 1.

FIG. 2 is a block diagram schematically showing a software arrangement of the MFP 100 in FIG. 1. Referring to FIG. 2, the MFP 100 has an OS (Operating System) 201, a UI (User Interface) 202, a job controller 203, a fax 204, a send 205, a storage 206, a scan 207, a print 208, a device driver 209, the expansion application 210, a VM (Virtual Machine)/FW (Framework) 211, and a UI device controller 212 as software modules. Processes carried out by the above software modules are implemented by the CPU 101 executing main programs loaded into the RAM 103.

The OS 201 manages and controls execution of processes carried out by the software modules. The OS 201 is combined with the device driver 209. The UI 202 provides various types of information to the user via the display unit 105 and the operating unit 107 and receives various instructions from the user. The job controller 203 controls execution of jobs when it has received instructions to execute the jobs such as copying, printing, and faxing. The fax 204 carries out facsimile communications with an external apparatus via the modem 115 and the NCU 116. The send 205 carries out data communications with an external apparatus via the NIC 117. The storage 206 controls processes in which data such as image data to be faxed and setting data on the MFP 100 are stored in the eMMC 109. The scan 207 reads originals by controlling the reading unit 111. The print 208 performs printing on sheets by controlling the recording unit 113.

In the MFP 100, when, for example, the job controller 203 has received a fax job in which a placed original is faxed to an external apparatus, the scan 207 starts a scanning process by controlling the reading unit 111. As a result, the placed original is read, and facsimile image data is generated based on information that has been read. The facsimile image data is stored in the eMMC 109 by the storage 206. After that, the fax unit 204 reads out the stored facsimile image data and transmits the facsimile image data to the external apparatus via the NCU 116 by fax.

The device driver 209 acts as an arbitrator for data transfer between the software modules described above and hardware devices such as the display controller 104, the operation controller 106, and the reading controller 110. The expansion application 210 is a module installed to extend the function of the MFP 100. The function of the expansion application 210 will be described later. The expansion application 210 is comprised of an arbitrary program described in a script language. For the expansion application 210, languages such as Java (registered trademark) and Lua that are interpreters interpreting and executing byte codes are used.

The VM/FW 211 installs and uninstalls an expansion application comprised of an arbitrary program described in a script language or a predetermined high-level language. The VM/FW 211 performs, for example, arbitration between the installed expansion application and the native applications incorporated in advance. The VM/FW 211 carries out a process using the expansion application 210 by interpreting the script language constituting the expansion application 210. Also, when an event related to the expansion application 210 occurs, the VM/FW 211 sends a message to the expansion application 210. Examples of the event include a key input detected by the UI 202 and expiration of a timer managed by the VM/FW 211. Upon detecting an abnormal condition in a program of the expansion application 210, the VM/FW 211 forcibly terminates the program. Examples of the abnormal condition include lack of response to a message sent to the expansion application 210. The UI device controller 212 acts as an arbitrator in transmitting a display request received from the UI 202 or the expansion application 210 to the display unit 105. The UI device controller 212 also acts as an arbitrator in transmitting input information input by the user via the operating unit 107 to UI 202 or the expansion application 210.

In the MFP 100, when, for example, the user issues an instruction to start a copy job using a native application of the MFP 100 by using the operating unit 107, the device driver 209 is notified of a piece of operational information indicating the instruction to start the copy job via the operation controller 106. The device driver 209 notifies the UI device controller 212 of the piece of operational information. Based on the piece of operational information, the UI device controller 212 determines that a native application will be used, and notifies the UI 202 of the piece of operational information. Based on the piece of operational information, the UI 202 requests the job controller 203 to start a copying process.

Also, in the MFP 100, when, for example, the user issues an instruction to start an expansion application job using the expansion application 210 by using the operating unit 107, the device driver 209 is notified of another piece of operational information indicating the instruction to start the expansion application job via the operation controller 106. The device driver 209 notifies the UI device controller 212 of the other piece of operational information. Based on the other piece of operational information, the UI device controller 212 determines that the expansion application 210 will be used, and notifies the expansion application 210 of the other piece of operational information via the VM/FW 211. Based on the other piece of operational information, the expansion application 210 determines that the start of the expansion application job has been instructed, and requests the job controller 203 to start an expansion application job process via the VM/FW 211.

Figure 3:
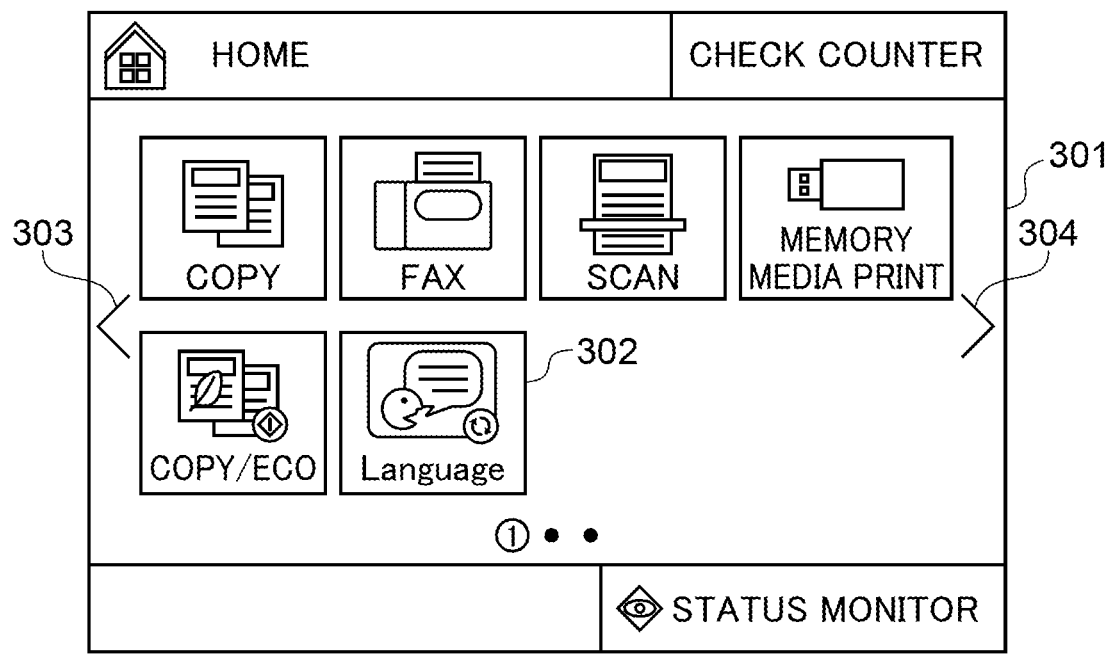
FIG. 3 is a view showing an example of a home screen which is displayed on a display unit in FIG. 1.

FIG. 3 is a view showing an example of a home screen 301 which is displayed on the display unit 105 in FIG. 1. A plurality of application buttons for calling applications of the MFP 100 is displayed on the home screen 301. For example, when the user depresses a language switching button 302 (language switching instruction receiving button), the expansion application 210 associated with the language switching button 302 is started to carry out a process. The number of buttons that can be displayed on the home screen 301 is prescribed in advance. The user displays other application buttons on the display unit 105 by depressing switching buttons 303 and 304 on the home screen 301.

FIGS. 4A to 4F are views useful in explaining a first switching process in which display languages on the display unit 105 in FIG. 1 are switched.

Figure 4A:
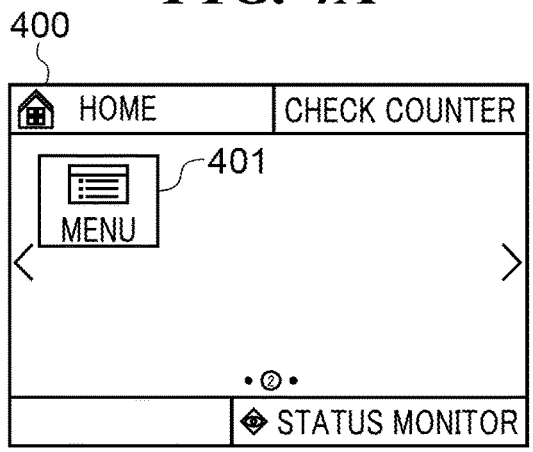
FIGS. 4A to 4F are views useful in explaining a first switching process in which a display language on the display unit in FIG. 1 is switched.
Figure 4B:
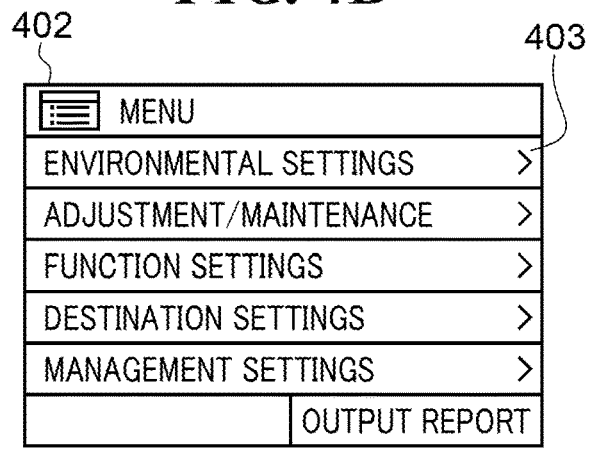
Figure 4C:
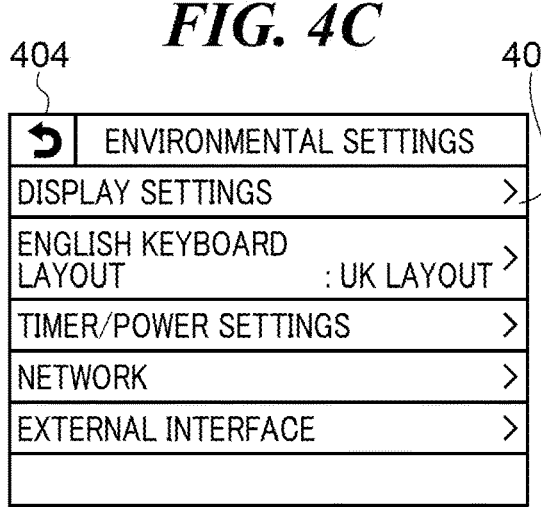
Figure 4D:
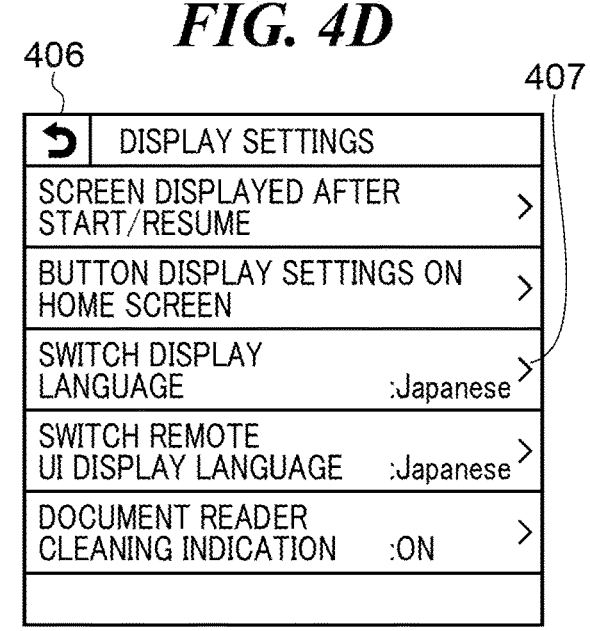
Figure 4E:
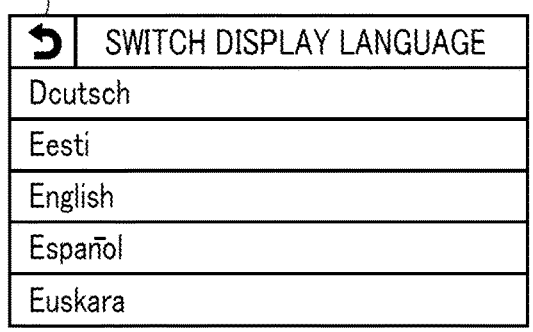
Figure 4F:
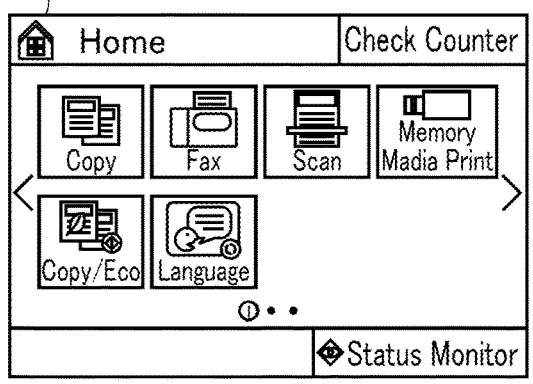

In the MFP 100, when the user depresses a menu button 401 included in a home screen 400 in FIG. 4A, a menu screen 402 in FIG. 4B is displayed on the display unit 105. A plurality of setting items such as environment settings and maintenance settings on the MFP 100 is displayed on the menu screen 402. When the user depresses an environment setting 403 on the menu screen 402, an environment setting screen 404 in FIG. 4C is displayed on the display unit 105. A plurality of setting items such as settings on display on the display unit 105, a keyboard layout, and timer settings is displayed on the environment setting screen 404. When the user depresses a display setting 405 on the environment setting screen 404, a display setting screen 406 in FIG. 4D is displayed on the display unit 105. A plurality of setting items relating to display on the display unit 105 is displayed on the display setting screen 406. When the user depresses a display language switch 407 on the display setting screen 406, a display language switching screen 408 in FIG. 4E is displayed on the display unit 105. List information on languages that can be displayed on the display unit 105 is displayed on the display language switching screen 408. When the user selects one language from the list information on the display language switching screen 408, a display language on the display unit 105 is switched to the language selected on the display language switching screen 408 as with a home screen 409 in FIG. 4F. Language setting information indicating the language selected on the display language switching screen 408 is stored in the eMMC 109. The first switching process is carried out by the UI device controller 212 providing notification to the UI 202 in response to a user operation received by the operating unit 107.

In the MFP 100, the display language on the display unit 105 can be switched by a second switching process different from the first switching process described above. In the second switching process, the display language on the display unit 105 is switched by the user depressing the language switching button 302 corresponding to the expansion application 210 which is the language switching application, not by using the display language switching screen 408.

Figure 5:
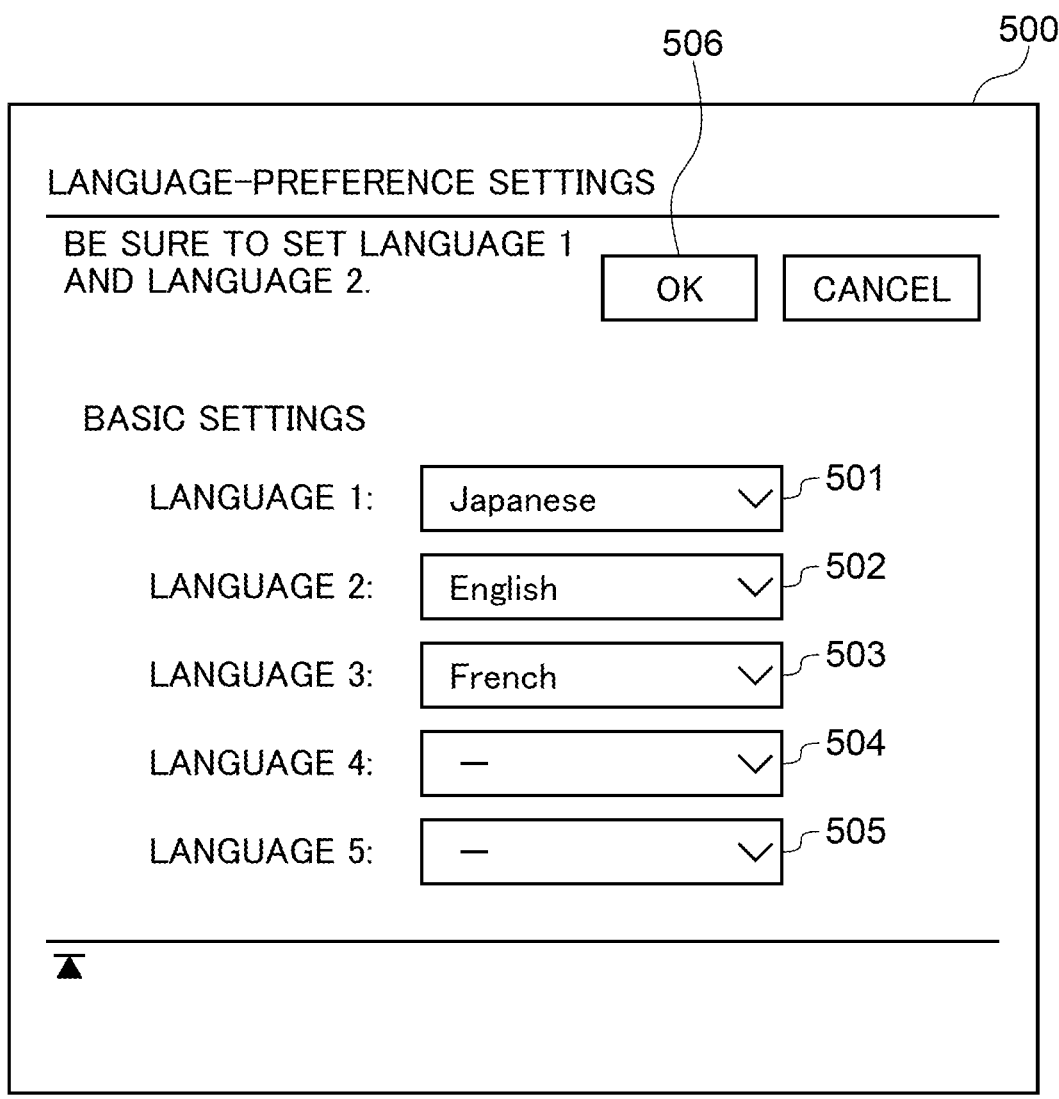
FIG. 5 is a view showing a setting screen on which settings for use in a second switching process in which a display language on the display unit in FIG. 1 is switched are configured.

FIG. 5 is a view showing a setting screen 500 on which settings for use in the second switching process in which the display language on the display unit 105 in FIG. 1 is switched are configured. For example, the setting screen 500 is displayed on a client terminal (not shown) connected to the MFP 100 via the LAN 119 or the Internet when the client terminal accesses the MFP 100 by using a Web browser.

On the setting screen 500, languages switched when the user depresses the language switching button 302 and the order of preferred languages are set. The setting screen 500 has setting fields 501 to 505 and an OK button 506. In the setting fields 501 to 505, one language is selected from languages that can be displayed on the display unit 105. Namely, in the present embodiment, a plurality of languages to be switched when the user depresses the language switching button 302 can be set on the setting screen 500, and a notification is provided to makes sure that languages are set in at least the setting fields 501 and 502. On the setting screen 500, preferred languages are set in the setting fields 501 to 505 in this order. When the user selects the OK button 506 with languages set on the setting screen 500, switching language information in which the languages set in the setting fields 501 to 505 are written in this order is generated. The switching language information is sent to the MFP 100. The MFP 100 stores the obtained switching language information in the eMMC 109 or the like and associates the switching language information with the language switching button 302.

Figure 6:
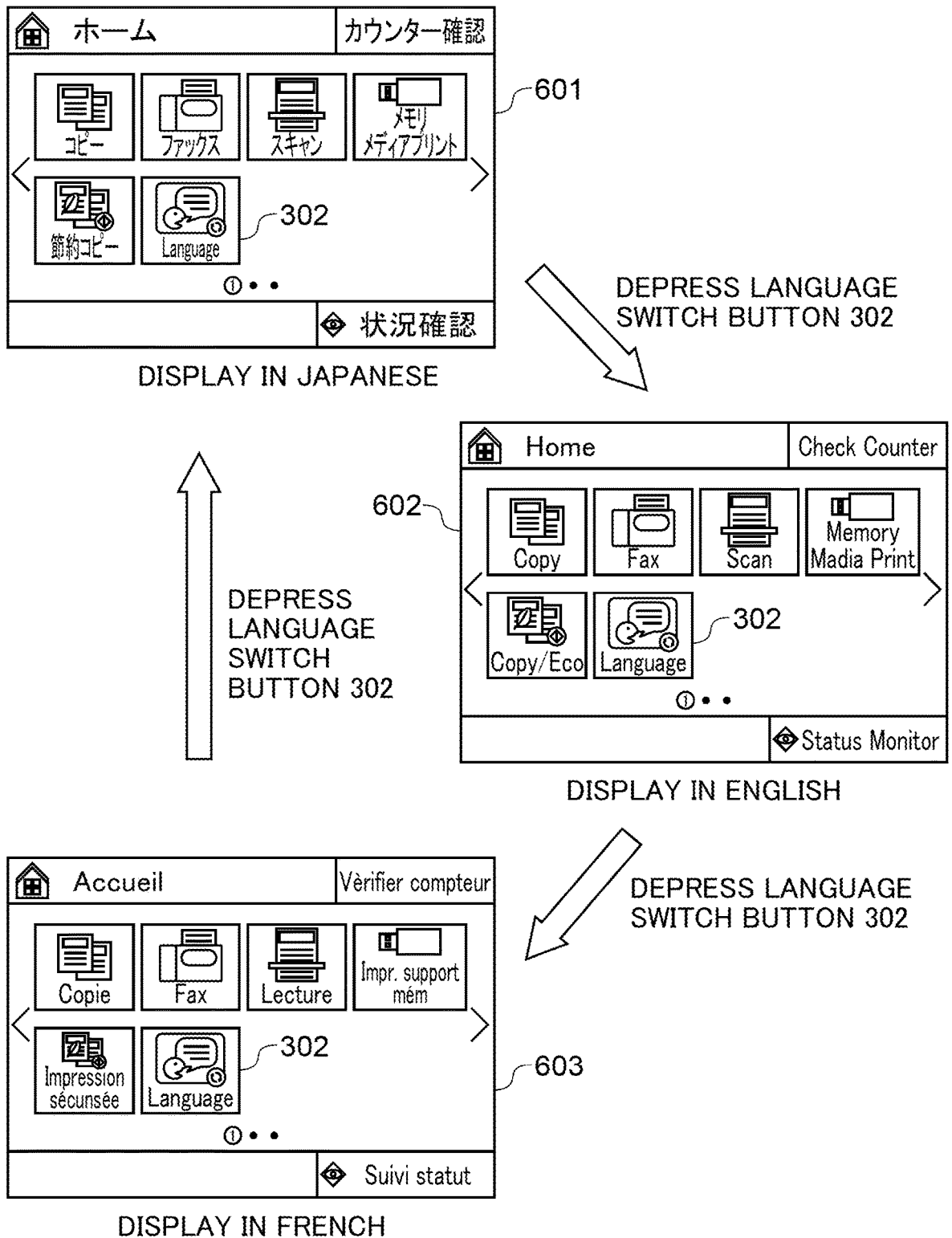
FIG. 6 is a view useful in explaining the second switching process in which a display language on an operating unit in FIG. 1 is switched.

FIG. 6 is a view useful in explaining the second switching process in which the display language on the operating unit 107 in FIG. 1 is switched. In the following description, it is assumed that, for example, switching language information in which "Japanese", "English", and "French" are set in this order is stored in the eMMC 109. The second switching process is carried out by the UI device controller 212 providing notification to the expansion application 210, which is the language switching application, via the VM/FW211 in response to depression of the language switching button 302.

In the MFP 100, when the user depresses the language switching button 302 with the display language being "Japanese" as with a home screen 601 in FIG. 6, the display language is switched to "English" as with a home screen 602. When the user depresses the language switching button 302 with the display language being "English", the display language is switched to "French" as with a home screen 603. When the user depresses the language switching button 302 with the display language being "French", the display language is switched to "Japanese" as with the home screen 601. Thus, in the present embodiment, whenever the language switching button 302 is depressed, the display language is switched according to the order set in the switching language information.

There are cases where the display language is not switched even when the user depresses the language switching button 302. For example, assume that one user switches the display language from "Japanese" to "English" using the display language switching screen 408 in the MFP 100 in which the switching language information indicating "Japanese", "English", and "French" in order of preference is stored in the eMMC 109 as described above. When the other user then depresses the language switching button 302 with the display language being "English", the other user expects the display language to switch to "French". The expansion application 210, however, cannot recognize the instruction which was issued using the display language switching screen 408 before the language switching button 302 was depressed. The expansion application 210 thus recognizes the depression of the language switching button 302 by the other user as an instruction to switch from "Japanese" to "English". For this reason, although the display language is "English", the expansion application 210 sets the display language at "English", and the display language is not switched, which confuses the user.

To cope with this problem, in the present embodiment, when the user has depressed the language switching button 302, the display language on the display unit 105 is switched to one language that is one of a plurality of languages set in the switching language information and is different from a language currently displayed on the display unit 105.

Figure 7:
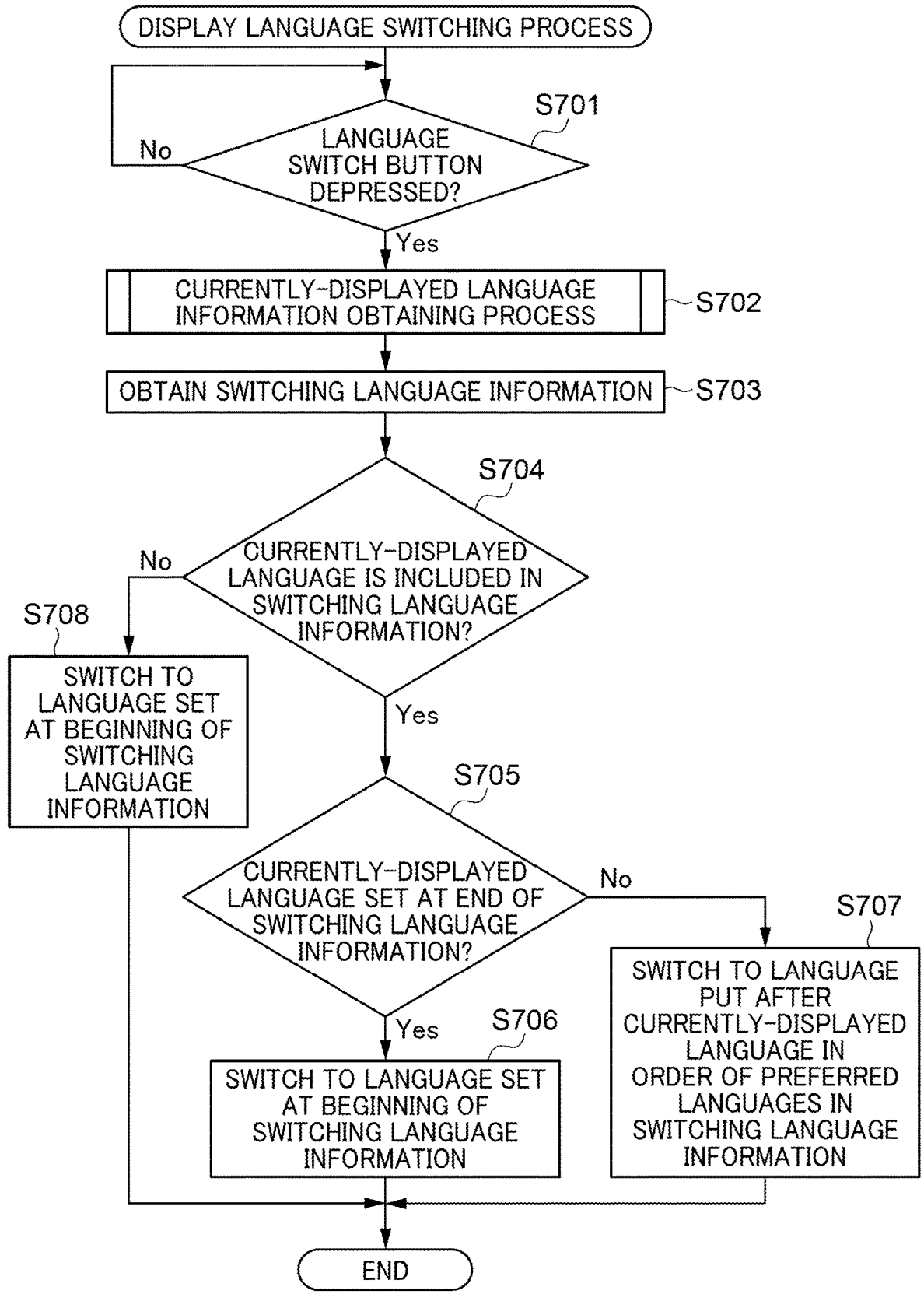
FIG. 7 is a flowchart showing the procedure of a display language switching process which is carried out by the MFP in FIG. 1.

FIG. 7 is a flowchart showing the procedure of a display language switching process which is carried out by the MFP 100 in FIG. 1.

The process in FIG. 7 is based on the assumption that, for example, the switching language information indicating "Japanese", "English", and "French" as the order of language preferences is stored in the eMMC 109 as described above.

Referring to FIG. 7, first, when the user depresses the language switching button 302 (YES in step S701), the CPU 101 carries out a currently-displayed language information obtaining process in FIG. 8, to be described later (step S702). In the step S702, the CPU 101 obtains currently-displayed language information, which is stored in the eMMC 109, from the storage 206. The currently-displayed language information is information indicating a language currently being displayed on the display unit 105 (hereafter referred to as "the currently-displayed language"). Next, the CPU 101 obtains switching language information from the storage 206 (step S703). Then, the CPU 101 determines whether or not the currently-displayed language is included in the switching language information (step S704).

As a result of the determination in the step S704, when the currently-displayed language is included in the switching language information, the CPU 101 determines whether or not the currently-displayed language is set at the end of the switching language information (step S705).

As a result of the determination in the step S705, when the currently-displayed language is set at the end of the switching language information, the CPU 101 switches the display language on the display unit 105 to a language set at the beginning of the switching language information (step S706). In the step S706, when, for example, the display language is "French" set at the end of the switching language information, the CPU 101 switches the display language to "Japanese" set at the beginning of the switching language information. The CPU 101 also sets "Japanese" as the currently-displayed language information. The CPU 101 requests the storage 206 to write the currently-displayed language information. As a result, the currently-displayed language information in which "Japanese" is set as the currently-displayed language is stored in the eMMC 109. After that, the CPU 101 ends the present process.

As a result of the determination in the step S705, when the currently-displayed language is not set at the end of the switching language information, the CPU 101 switches the display language on the display unit 105. Specifically, the CPU 101 switches the display language on the display unit 105 to a language put after the currently-displayed language in the order of preferred languages in the switching language information (step S707). In the step S707, when, for example, the currently-displayed language is "Japanese", the CPU 101 switches the display language to "English" put after "Japanese" in the switching language information. The CPU 101 also sets the language put after the currently-displayed language in the switching language information as the currently-displayed language information. The CPU 101 requests the storage 206 to write the currently-displayed language information and ends the present process.

As a result of the determination in the step S704, when the currently-displayed language is not included in the switching language information, the CPU 101 switches the display language on the display unit 105 to a language set at the beginning of the switching language information (step S708). In the step S708, when, for example, the currently-displayed language is "Chinese" which is not included in the switching language information, the CPU 101 switches the display language on the display unit 105 to "Japanese" set at the beginning of the switching language information. The CPU 101 also sets the language set at the beginning of the switching language information as the currently-displayed language information. The CPU 101 requests the storage 206 to write the currently-displayed language information and ends the present process.

Figure 8:
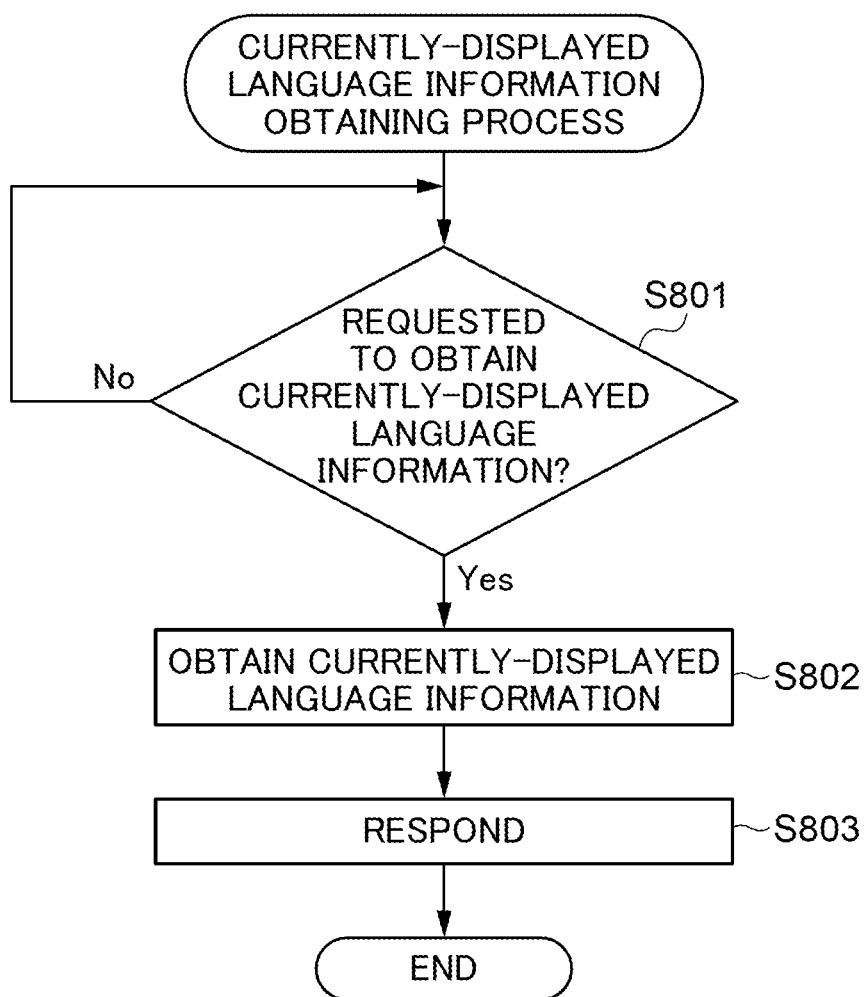
FIG. 8 is a flowchart showing the procedure of a currently-displayed language information obtaining process in step S702 in FIG. 7.

FIG. 8 is a flowchart showing the procedure of the currently-displayed language information obtaining process in the step S702 in FIG. 7.

Referring to FIG. 8, the CPU 101 requests the storage 206 to obtain the currently-displayed language information (YES in step S801) and obtains the currently-displayed language information stored in the eMMC 109 (step S802). Then, the CPU 101 sends a response to the storage 206 to the effect that the currently-displayed language information has been obtained (step S803) and ends the present process.

According to the embodiment described above, when the user depresses the language switching button 302, the display language on the display unit 105 is switched to one language that is one of a plurality of languages set in the switching language information and is different from a language currently displayed on the display unit 105. As a result, even when one user switches the display language on the display unit 105 using the display language switching screen 408 before the other user depresses the language switching button 302, the display language is reliably switched in response to the depression of the language switching button 302.

Moreover, in the embodiment described above, when the currently-displayed language is not included in the switching language information, the display language on the display unit 105 is switched to a language set at the beginning of the switching language information. As a result, when the user depresses the language switching button 302 while a language which is not included in the switching language information is being displayed on the display unit 105, the display language on the display unit 105 is switched to a language put at the top in the order of preferred languages by the user.

In the embodiment described above, when the currently-displayed language is included in the switching language information, the display language on the display unit 105 is switched to a language put after the currently-displayed language in the order of preferred languages in the switching language information. Moreover, when the currently-displayed language is included in the switching language information, and the currently-displayed language is set at the end of the switching language information, the display language on the display unit 105 is switched to a language set at the beginning of the switching language information. As a result, when the user depresses the language switching button 302 while a language included in the switching language information is being displayed on the display unit 105, the display language on the display unit 105 is switched according to the order of preferred languages in the switching language information as expected by the user.

It should be noted that the setting screen 500 may be displayed on the display unit 105 of the MFP 100 as well.

Moreover, although in the description of the embodiment described above, the language switching button 302 is an operating button displayed on the display unit 105, this is not limitative, but the language switching button 302 may be a hard key provided on the operating unit 107.

In the embodiment described above, when a language switching application is installed in the MFP 100, the CPU 101 may provide control such that operations on the display language switch 407 on the display setting screen 406 are not received. This prevents issuance of an instruction to switch the display language using the display language switching screen 408, which is a factor preventing the display language from switching to another language when the user depresses the language switching button 302.

Moreover, in the embodiment described above, only languages included in the switching language information may be selectable on the display language switching screen 408. This enables the user to select a language for switching from among languages likely to be actually selected and thus enables the user to easily select a language for switching.

In the embodiment described above, when a display language displayed after switching by the first switching process is not included in the switching language information, the user may choose whether or not to set the display language in the switching language information.

Figure 9:
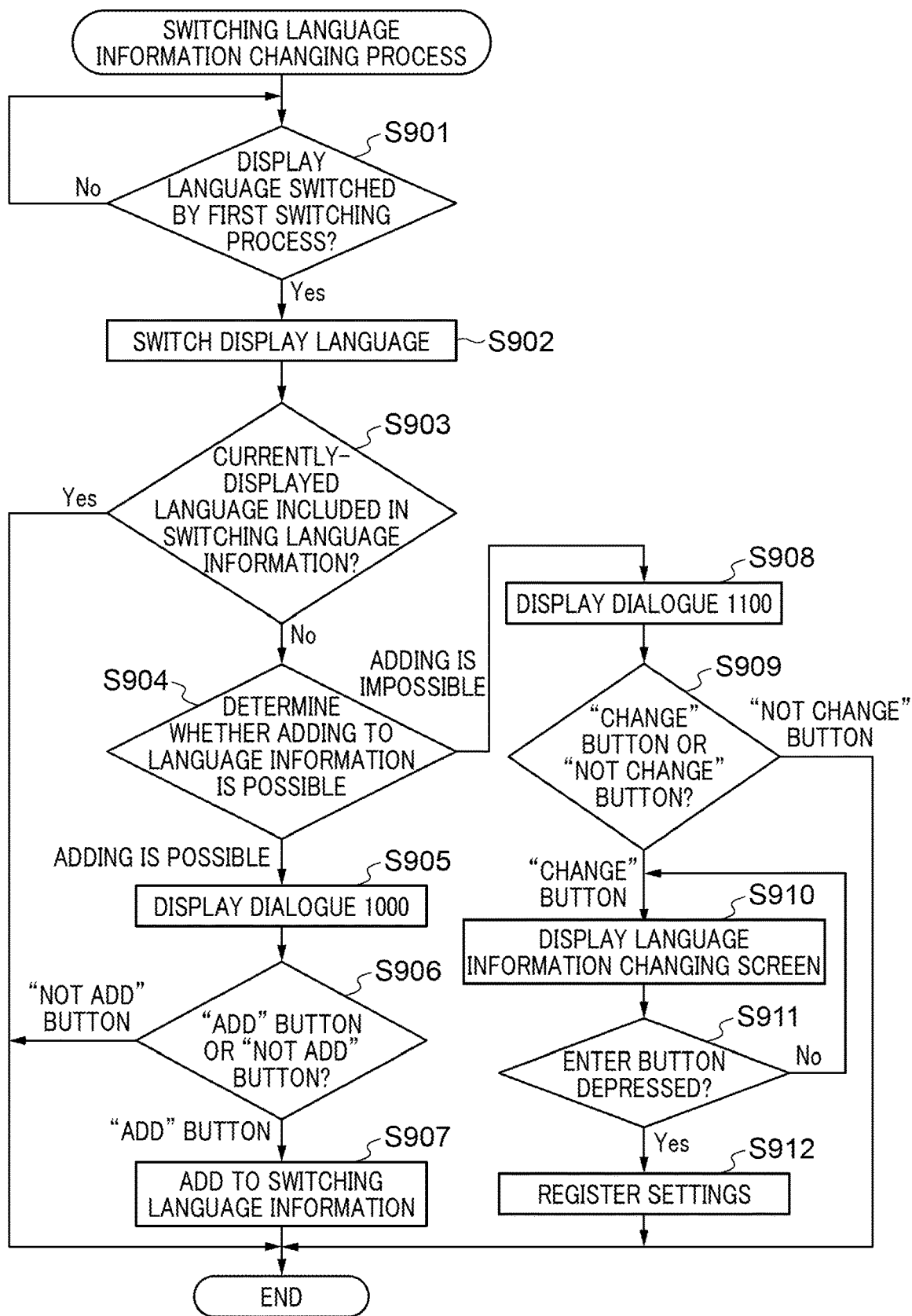
FIG. 9 is a flowchart showing the procedure of a switching language information changing process which is carried out by the MFP in FIG. 1.

FIG. 9 is a flowchart showing the procedure of a switching language information changing process which is carried out by the MFP 100 in FIG. 1.

The process in FIG. 9 is implemented by the CPU 101 executing a program stored in the ROM 102.

Referring to FIG. 9, when the display language on the display unit 105 is switched by the first switching process (YES in step S901), the CPU 101 switches the display language on the display unit 105 to a language selected on the display language switching screen 408 (step S902). Then, the CPU 101 determines whether or not a currently-displayed language which is the display language after the switching is included in the switching language information (step S903).

As a result of the determination in the step S903, when the currently-displayed language is included in the switching language information, the CPU 101 ends the present process. As a result of the determination in the step S903, when the currently-displayed language is not included in the switching language information, the CPU 101 determines whether or not it is possible to add a new language to the switching language information (step S904). In the step S904, when language is not set in at least one of the setting fields 501 to 505 on the setting screen 500, the CPU 101 determines that it is possible to add a new language to the switching language information. On the other hand, when languages are set in all of the setting fields 501 to 505 on the setting screen 500, the CPU 101 determines that it is impossible to add a new language to the switching language information.

Figure 10:
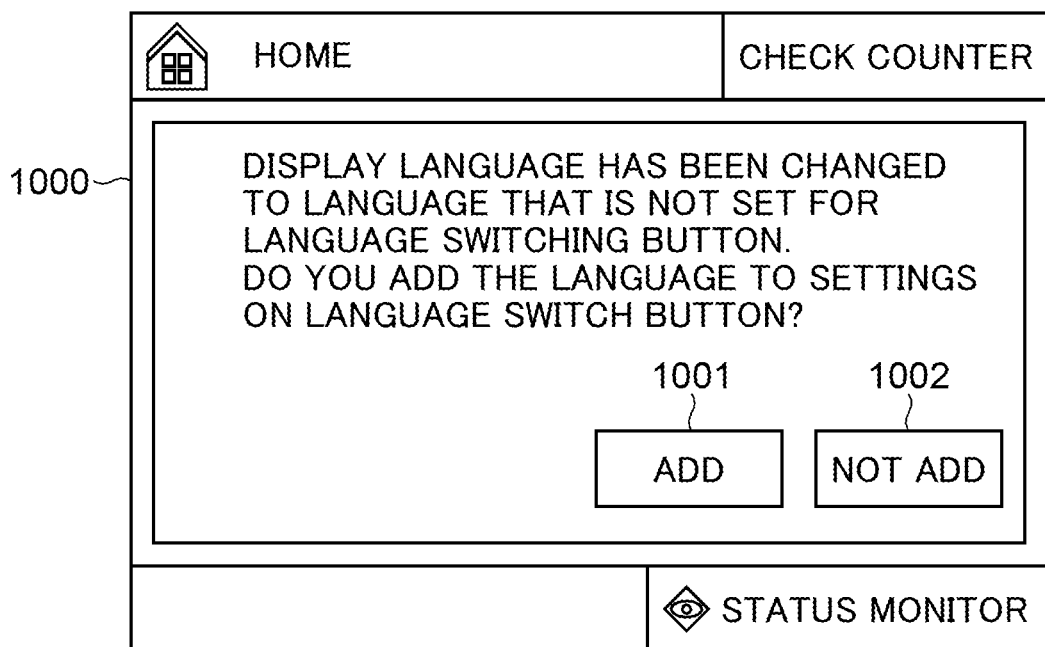
FIG. 10 is a view showing an example of a dialogue which is displayed on the display unit in a process in step S905 in FIG. 9.

As a result of the determination in the step S904, when it is possible to add a new language to the switching language information, the CPU 101 displays a dialogue 1000 in FIG. 10 on the display unit 105 (step S905). The dialogue 1000 is a screen on which the user chooses whether or not to add the currently-displayed language to the switching language information. The dialogue 1000 has an "add" button 1001 and a "not add" button 1002. The "add" button 1001 is selected when the user gives an instruction to add the currently-displayed language to the switching language information. The "not add" button 1002 is selected when the user gives an instruction not to add the currently-displayed language to the switching language information. The user selects the "add" button 1001 or the "not add" button 1002 on the dialogue 1000. Then, the CPU 101 determines whether the user has selected the "add" button 1001 or the "not add" button 1002 on the dialogue 1000 (step S906).

As a result of the determination in the step S906, when the user has selected the "not add" button 1002, the CPU 101 ends the present process. As a result of the determination in the step S906, when the user has selected the "add" button 1001, the CPU 101 adds the currently-displayed language to the end of the switching language information (step S907). It should be noted that in the present embodiment, as a result of the determination in the step S904, when it is possible to add a new language to the switching language information, the currently-displayed language may be automatically added to the end of the switching language information without the processes in the steps S905 and 906 being carried out. After that, the CPU 101 ends the present process.

Figure 11:
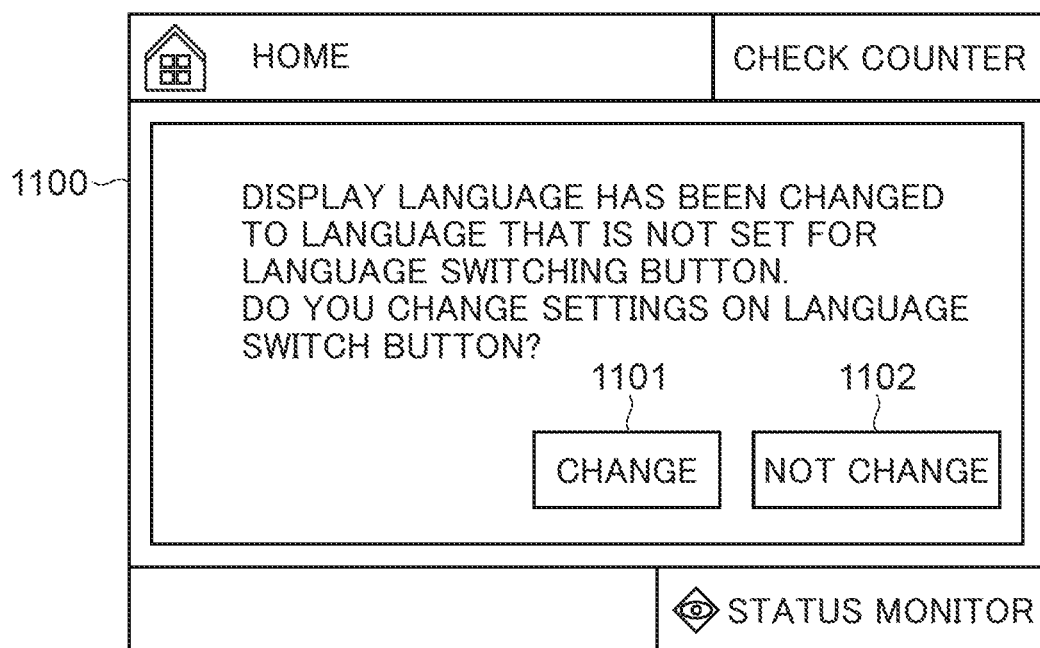
FIG. 11 is a view showing an example of a dialogue which is displayed on the display unit in a process in step S908 in FIG. 9.

As a result of the determination in the step S904, when it is impossible to add a new language to the switching language information, the CPU 101 displays a dialogue 1100 in FIG. 11 on the display unit 105 (step S908). The dialogue 1100 is a screen on which the user chooses whether or not to change the switching language information. The dialogue 1100 has a "change button 1101 and a "not change" button 1102. The "change" button 1101 is selected when the user gives an instruction to change the switching language information. The "not change" button 1102 is selected when the user gives an instruction not to change the switching language information. The user selects the "change" button 1101 or the "not change" button 1102 on the dialogue 1100. Then, the CPU 101 determines whether the user has selected the "change" button 1101 or the "not change" button 1102 on the dialogue 1100 (step S909).

Figure 12A:
FIGS. 12A and 12B are views showing examples of a screen which is displayed on the display unit in a process in step S910 in FIG. 9.

As a result of the determination in the step S909, when the user has selected the "not change" button 1102, the CPU 101 ends the present process. As a result of the determination in the step S909, when the user has selected the "change" button 1101, the CPU 101 displays a language information changing screen 1200 in FIG. 12A on the display unit 105 (step S910).

Figure 12B:

The language information changing screen 1200 is a screen for changing languages set in the switching language information. The language information changing screen 1200 has setting fields 1201 to 1205 and an enter button 1206. In step S910 the language information changing screen 1200 is displayed in a state where languages set in the switching language information have been entered into the setting fields 1201 to 1205. For example, when "Japanese", "English", and "French" are set in this order in the switching language information, the language information changing screen 1200 with "Japanese" entered into the setting field 1201, "English" entered into the setting field 1202, and "French" entered into the setting field 1201 is displayed on the display unit 105. When the user selects any of the setting fields 1201 to 1205, for example, the setting field 1201, the language information changing screen 1200 switches to a language selecting screen 1207 in FIG. 12B on the display unit 105. List information indicating language types that can be displayed on the display unit 105 is displayed on the language selecting screen 1207. When the user selects one language, for example, "Italian" from the list information on the language selecting screen 1207, the language selecting screen 1207 switches to the language information changing screen 1200 on the display unit 105. In this case, "Italian" selected by the user on the language selecting screen 1207 has been entered into the setting field 1201 on the language information changing screen 1200. The enter button 1206 is selected when the user gives an instruction to confirm the settings on the language information changing screen 1200. Then, the CPU 101 determines whether or not the user has selected the enter button 1206 (step S911).

As a result of the determination in the step S911, when the user has not selected the enter button 1206, the process returns to the step S910. As a result of the determination in the step S911, when the user has selected the enter button 1206, the CPU 101 registers the settings on the language information changing screen 1200 (step S912). As a result, the switching language information is updated to the settings configured on the language information changing screen 1200. After that, the CPU 101 ends the present process.

Figure 14A:
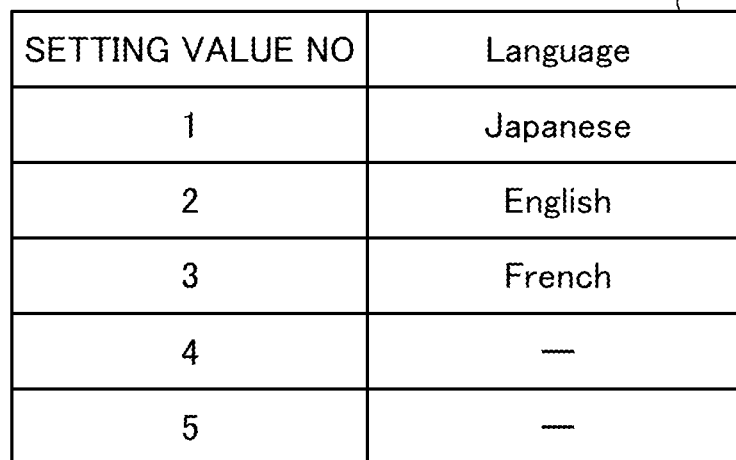
FIGS. 14A and 14B are views showing examples of switching language information and setting values for use in the display language switching process in FIG. 13.

FIG. 13 is a flowchart showing the procedure of a variation of the display language switching process in FIG. 7. The process in FIG. 13 is also implemented by the CPU 101 executing a program in the ROM 102 as with the process in FIG. 7. In the process in FIG. 13, it is assumed that switching language information 1401 in FIG. 14A has already been stored in the eMMC 109. In the switching language information 1401, "Japanese", "English", and "French" are set in this order, and setting value Nos indicating the order of preferred languages are associated with the respective languages. In the process in FIG. 13, it is also assumed that to switch the display language on the display unit 105, only the language switching button 302 can be used, and the display language switching screen 408 cannot be used.

Figure 14B:
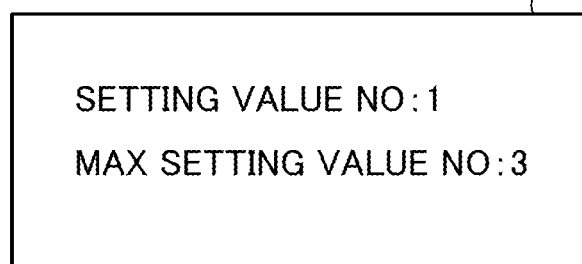

Referring to FIG. 13, when the user depresses the language switching button 302 (YES in the step S701), the CPU 101 reads out the switching language information 1401 (step S1301). Then, the CPU 101 sets setting values 1402 in FIG. 14B. The setting values 1402 include a language setting value No and a max setting value No. The language setting value No is a setting value No indicating the currently-displayed language. The max setting value No is a lowest level setting value No among setting value Nos with which languages are associated in the switching language information 1401. After that, the CPU 101 determines whether or not the language setting value No is smaller than the max setting value No (step S1302).

As a result of the determination in the step S1302, when the language setting value No is smaller than the max setting value No, the CPU 101 updates the setting values 1402 by adding one to the language setting value No (step S1303). Then, the CPU 101 switches the display language on the display unit 105 to a language indicated by the language setting value No of the setting values 1402 updated in the step S1303 (step S1304) and ends the present process.

As a result of the determination in the step S1302, when the language setting value No is not smaller than the max setting value No, that is, the language setting value No is the same as the max setting value No, the CPU 101 updates the setting values 1402 by setting the language setting value No at 1 (step S1305). Then, the CPU 101 switches the display language on the display unit 105 to a language indicated by the language setting value No of the setting values 1402 updated in the step S1305 (step S1306) and ends the present process.

In the embodiment described above, to switch the display language on the display unit 105, the user may be allowed to make a setting as to whether only the language switching button 302 or both the language switching button 302 and the display language switching screen 408 can be used. For example, after carrying out the process in the step S701, the CPU 101 makes a determination as to settings made by the user as described above. When the setting that allows use of only the language switching button 302 is made, the CPU 101 carries out the processes in the step S1301 and the subsequent steps. When the setting that allows use of both the language switching button 302 and the display language switching screen 408 is made, the CPU 101 carries out the processes in the step S702 and the subsequent steps.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-052790, filed Mar. 20, 2018 and No.

2018-225119, filed Nov. 30, 2018, which are hereby incorporated by reference herein in its entirety.

What is claimed is:

1. An information processing apparatus that has a touch panel and switches a display language on the touch panel, comprising:
   a display control unit configured to cause the touch panel to display a first language switching button and a second language switching button for switching the display language on the touch panel;
   a first switching unit configured to receive a selection of the first language switching button from a user and switch the display language on the touch panel to a language selected by the user from a list of languages displayed on the touch panel;
   a second switching unit configured to, according to selection of the second language switching button by a user, switch the display language on the touch panel to one of a plurality of languages associated with the second language switching button based on a display order of the plurality of languages, the plurality of languages and the display order being set by a user in advance; and
   an obtaining unit configured to obtain a language currently displayed on the touch panel, switched by at least the first switching unit out of the first switching unit and the second switching unit, according to selection of the second language switching button by a user,
   wherein in a case where the second language switching button is selected by the user, the second switching unit switches the display language on the touch panel to a language put after the currently displayed language in the display order of the plurality of languages, different from the language obtained by the obtaining unit based on the display order.

2. The information processing apparatus according to claim 1, wherein switching language information in which the plurality of languages is set is stored, and
   in a case where a language currently displayed on the touch panel is not included in the switching language information, the second switching unit switches the display language on the touch panel to a language set at a beginning of the switching language information.

3. The information processing apparatus according to claim 2, wherein in a case where a language currently displayed on the touch panel is included in the switching language information, the second switching unit switches the display language on the touch panel to a language put after the language currently displayed on the touch panel in the switching language information.

4. The information processing apparatus according to claim 2, wherein in a case where a language currently displayed on the touch panel is included in the switching language information, and the language currently displayed on the touch panel is set at an end of the switching language information, the second switching unit switches the display language on the touch panel to a language set at a beginning of the switching language information.

5. The information processing apparatus according to claim 1, wherein the information processing apparatus is an image forming apparatus that carries out an image forming process.

6. A control method for an information processing apparatus that has a touch panel and switches a display language on the touch panel, comprising:
   a display control step of causing the touch panel to display a first language switching button and a second language switching button for switching the display language on the touch panel;
   a first switching step of receiving a selection of the first language switching button from a user and switching the display language on the touch panel to a language selected by a user from a list of languages displayed on the touch panel;
   a second switching step of, according to selection of the second language switching button by a user, switching the display language on the touch panel to one of a plurality of languages associated with the second language switching button based on display order of the plurality of languages, the plurality of languages and the display order being set by a user in advance; and
   an obtaining step of obtaining a language currently displayed on the touch panel, switched by at least the first switching unit out of the first switching unit and the second switching unit, according to selection of the second language switching button by a user,
   wherein in a case where the second language switching button is selected by the user, the second switching step switches the display language on the touch panel to a language put after the currently displayed language in the display order of the plurality of languages, different from the language obtained in the obtaining step based on the display order.

7. A non-transitory computer-readable storage medium storing a program for causing a computer to execute a control method for an information processing apparatus that has a touch panel and switches a display language on the touch panel, the control method for the information processing apparatus comprising:
   a display control step of causing the touch panel to display a first language switching button and a second language switching button for switching the display language on the touch panel;
   a first switching step of receiving a selection of the first language switching button from a user and switching the display language on the touch panel to a language selected by a user from a list of languages displayed on the touch panel;
   a second switching step of, according to selection of the second language switching button by a user, switching the display language on the touch panel to one of a plurality of languages associated with the second language switching button based on a display order of the plurality of languages, the plurality of languages and the display order being set by a user in advance; and
   an obtaining step of obtaining a language currently displayed on the touch panel, switched by at least the first switching unit out of the first switching unit and the second switching unit, according to selection of the second language switching button by a user,
   wherein in a case where the second language switching button is selected by the user, the second switching step switches the display language on the touch panel to a language put after the currently displayed language in the display order of the plurality of languages, different from the language obtained in the obtaining step based on the display order.

* * * * *